(12) United States Patent
Wang et al.

(10) Patent No.: US 10,574,394 B2
(45) Date of Patent: *Feb. 25, 2020

(54) ADAPTIVE CYCLIC REDUNDANCY CHECK FOR UPLINK CONTROL INFORMATION ENCODING

(71) Applicant: AT&T Intellectual Property I, L.P., Atlanta, GA (US)

(72) Inventors: Xiaoyi Wang, Austin, TX (US); SaiRamesh Nammi, Austin, TX (US); Arunabha Ghosh, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/251,802

(22) Filed: Jan. 18, 2019

(65) Prior Publication Data

US 2019/0158224 A1 May 23, 2019

Related U.S. Application Data

(63) Continuation of application No. 15/402,097, filed on Jan. 9, 2017, now Pat. No. 10,225,046.

(51) Int. Cl.
*H04L 1/00* (2006.01)
*H04B 17/309* (2015.01)

(52) U.S. Cl.
CPC ......... *H04L 1/0061* (2013.01); *H04B 17/309* (2015.01)

(58) Field of Classification Search
CPC .... H04B 17/309; H03M 13/09; H04L 1/0061; H04L 1/0072; H04L 1/0083; H04W 72/0413
See application file for complete search history.

(56) References Cited

U.S. PATENT DOCUMENTS

| 5,734,826 A | 3/1998 | Olnowich et al. |
| 5,954,835 A | 9/1999 | Higginson et al. |

(Continued)

FOREIGN PATENT DOCUMENTS

| EP | 1427109 | 6/2004 |
| GB | 201309801 | 7/2013 |

(Continued)

OTHER PUBLICATIONS

Gong, et al. "Flexible Air iNTerfAce for Scalable service delivery wiThin wIreless Communication networks of the 5th Generation (Fantastic-5G):Preliminary results for multiservice support in link solution adaptation," Fantastic, fantastic5g.eu, May 30, 2016, 213 pages.

(Continued)

*Primary Examiner* — Eric Nowlin
(74) *Attorney, Agent, or Firm* — Amin, Turocy & Watson, LLP

(57) ABSTRACT

An adaptive cyclic redundancy check process for uplink control information signaling is provided to allow a number of cyclic redundancy check bits to be adjusted based on the likelihood of data being corrupted during transmission. In an embodiment, a base station device can send a cyclic redundancy check length map to a mobile device that indicates to the mobile device to use a specific number of cyclic redundancy bits to use per a specified payload size of uplink control information. Optionally, the mobile device can determine a number of cyclic redundancy bits to include in the uplink control information, and use two stage uplink control information signaling to indicate to the base station how many cyclic redundancy check bits there are in the succeeding stage.

20 Claims, 10 Drawing Sheets

(56) References Cited

U.S. PATENT DOCUMENTS

| | | | |
|---|---|---|---|
| 6,425,106 B1 | 7/2002 | Higginson et al. | |
| 6,470,470 B2 | 10/2002 | Jarvinen et al. | |
| 6,477,669 B1 | 11/2002 | Agarwal et al. | |
| 6,609,225 B1 | 8/2003 | Ng | |
| 6,970,441 B1 | 11/2005 | Pirhonen et al. | |
| 7,027,418 B2 | 4/2006 | Gan et al. | |
| 7,266,760 B1 | 9/2007 | Bain | |
| 7,420,948 B2 | 9/2008 | Pirhonen et al. | |
| 7,424,040 B2 | 9/2008 | Walden | |
| 7,752,522 B2 | 7/2010 | Saifuddin et al. | |
| 7,912,133 B2 | 3/2011 | Cheon et al. | |
| 7,913,150 B2 | 3/2011 | Miranda | |
| 7,941,727 B2 | 5/2011 | Greenlaw | |
| 8,149,835 B2 | 4/2012 | Kim et al. | |
| 8,171,372 B2* | 5/2012 | Pan | H04L 1/1861 714/758 |
| 8,385,268 B2 | 2/2013 | Chen et al. | |
| 8,521,210 B2 | 8/2013 | Dai et al. | |
| 8,572,461 B2* | 10/2013 | Pan | H04L 1/1861 714/758 |
| 8,577,299 B2* | 11/2013 | Agrawal | H04B 7/2656 455/65 |
| 8,625,516 B2 | 1/2014 | Lindoff et al. | |
| 8,705,390 B2 | 4/2014 | Zhai | |
| 8,707,129 B2* | 4/2014 | Pan | H04L 1/1861 714/758 |
| 8,989,147 B1 | 3/2015 | Mater et al. | |
| 9,048,998 B2* | 6/2015 | Pan | H04L 1/1861 |
| 9,055,572 B2 | 6/2015 | Aiba et al. | |
| 9,088,971 B2 | 7/2015 | Anderson et al. | |
| 9,143,167 B2 | 9/2015 | Varadarajan et al. | |
| 9,191,176 B2 | 11/2015 | Jang et al. | |
| 9,282,478 B2* | 3/2016 | Jiang | H04W 24/08 |
| 9,345,008 B2* | 5/2016 | Jang | H04L 5/0053 |
| 9,419,832 B2 | 8/2016 | Yamada et al. | |
| 9,459,954 B2* | 10/2016 | Pan | H04L 1/1861 |
| 9,501,926 B1 | 11/2016 | Meninno et al. | |
| 9,787,434 B2 | 10/2017 | Lin et al. | |
| 9,826,540 B1 | 11/2017 | Li et al. | |
| 9,894,654 B2 | 2/2018 | Astely et al. | |
| 10,015,001 B2 | 7/2018 | Fang et al. | |
| 10,037,243 B2* | 7/2018 | Pan | H04L 1/1861 |
| 10,103,849 B2* | 10/2018 | Park | H04L 1/1812 |
| 10,318,374 B2* | 6/2019 | Pan | H04L 1/1861 |
| 10,321,437 B2* | 6/2019 | Yamada | H04L 1/003 |
| 2002/0136268 A1 | 9/2002 | Gan et al. | |
| 2004/0153935 A1 | 8/2004 | Niesen | |
| 2005/0249236 A1 | 11/2005 | Walden | |
| 2006/0013325 A1* | 1/2006 | Agrawal | H04B 7/2656 375/260 |
| 2007/0297451 A1* | 12/2007 | Kim | H04L 1/0041 370/469 |
| 2008/0115040 A1 | 5/2008 | Greenlaw | |
| 2008/0168332 A1 | 7/2008 | Palanki et al. | |
| 2009/0006925 A1* | 1/2009 | Pan | H04L 1/1861 714/758 |
| 2009/0196244 A1 | 8/2009 | Chun et al. | |
| 2009/0225889 A1 | 9/2009 | Tsai et al. | |
| 2011/0059764 A1 | 3/2011 | Dai et al. | |
| 2011/0243066 A1 | 10/2011 | Nayeb Nazar et al. | |
| 2011/0255631 A1 | 10/2011 | Pi | |
| 2011/0310853 A1* | 12/2011 | Yin | H04L 1/0009 370/335 |
| 2012/0026944 A1* | 2/2012 | Yamada | H04L 1/003 370/328 |
| 2012/0134306 A1* | 5/2012 | Cheng | H04L 1/0042 370/281 |
| 2013/0003569 A1 | 1/2013 | Lindoff et al. | |
| 2013/0077595 A1 | 3/2013 | Aiba et al. | |
| 2013/0091401 A1* | 4/2013 | Pan | H04L 1/1861 714/755 |
| 2013/0201932 A1 | 8/2013 | Ko et al. | |
| 2013/0227381 A1 | 8/2013 | Akkarakaran et al. | |
| 2013/0279449 A1* | 10/2013 | Pan | H04L 1/1861 370/329 |
| 2013/0322398 A1 | 12/2013 | Jang et al. | |
| 2014/0120970 A1* | 5/2014 | Jiang | H04W 24/08 455/501 |
| 2014/0157080 A1 | 6/2014 | Hartwich | |
| 2014/0189464 A1* | 7/2014 | Pan | H04L 1/1861 714/758 |
| 2015/0180612 A1 | 6/2015 | Jeong et al. | |
| 2015/0212876 A1* | 7/2015 | Pan | H04L 1/1861 714/807 |
| 2015/0358924 A1 | 12/2015 | Papasakellariou | |
| 2016/0013810 A1 | 1/2016 | Gross et al. | |
| 2016/0100407 A1 | 4/2016 | Gaal et al. | |
| 2016/0173230 A1 | 6/2016 | Lin et al. | |
| 2016/0226644 A1 | 8/2016 | Gaal et al. | |
| 2016/0269149 A1* | 9/2016 | Pan | H04L 1/1861 |
| 2016/0323866 A1* | 11/2016 | Yamada | H04L 1/003 |
| 2016/0337106 A1 | 11/2016 | Fang et al. | |
| 2016/0353430 A1 | 12/2016 | Chen et al. | |
| 2017/0099680 A1 | 4/2017 | Chae et al. | |
| 2017/0230994 A1 | 8/2017 | You et al. | |
| 2017/0238345 A1 | 8/2017 | Liu et al. | |
| 2017/0244535 A1 | 8/2017 | Islam et al. | |
| 2017/0251465 A1 | 8/2017 | Andersson et al. | |
| 2017/0251466 A1 | 8/2017 | Astely et al. | |
| 2017/0332365 A1 | 11/2017 | Lin et al. | |
| 2017/0332377 A1 | 11/2017 | Tseng et al. | |
| 2017/0332386 A1 | 11/2017 | Li et al. | |
| 2018/0097555 A1 | 4/2018 | Nammi | |
| 2018/0199331 A1 | 7/2018 | Wang et al. | |
| 2018/0249456 A1* | 8/2018 | Liu | H04L 5/0053 |
| 2018/0307556 A1* | 10/2018 | Pan | H04L 1/1861 |
| 2019/0149291 A1* | 5/2019 | Xiong | H04L 5/0048 370/329 |
| 2019/0158125 A1* | 5/2019 | Carlough | H04L 1/0009 |
| 2019/0158126 A1* | 5/2019 | Carlough | H04L 1/1819 |
| 2019/0158218 A1* | 5/2019 | Carlough | H04L 1/0009 |
| 2019/0158219 A1* | 5/2019 | Blankenship | H03M 13/1102 |
| 2019/0200377 A1* | 6/2019 | Li | H04L 1/00 |
| 2019/0215823 A1* | 7/2019 | Kim | H04L 1/0026 |
| 2019/0250983 A1* | 8/2019 | Pan | G06F 11/1004 |

FOREIGN PATENT DOCUMENTS

| | | | |
|---|---|---|---|
| GB | 2514623 | 12/2014 | |
| JP | 5654621 | 1/2015 | |
| KR | 20090080443 A | 7/2009 | |
| KR | 20090082071 A | 7/2009 | |
| WO | 0152467 A1 | 7/2001 | |
| WO | 2009156798 A1 | 12/2009 | |
| WO | 2010013150 | 2/2010 | |
| WO | 2010090373 A1 | 8/2010 | |
| WO | 2011158921 | 12/2011 | |
| WO | 2016108556 A1 | 7/2016 | |
| WO | 2016159847 A1 | 10/2016 | |
| WO | 2016164328 A1 | 10/2016 | |
| WO | WO-2016182378 A1 * | 11/2016 | H04L 1/00 |
| WO | 20170119870 | 1/2017 | |
| WO | WO-2018131880 A1 * | 7/2018 | |
| WO | WO-2018172992 A1 * | 9/2018 | H03M 13/1102 |

OTHER PUBLICATIONS

Zhou, et al. "Optimum subpacket transmission for hybrid ARQ systems." IEEE transactions on communications 54.5 (2006): 934-942, 9 pages.

Office Action dated Apr. 30, 2018 for U.S. Appl. No. 15/402,097, 40 pages.

Notice of Allowance dated Oct. 22, 2018 for U.S. Appl. No. 15/402,097, 41 pages.

* cited by examiner

400

402

| CRC BIT LENGTH | UCI PAYLOAD SIZE |
|---|---|
| 8 | 40 |
| 12 | 60 |
| 16 | 80 |

FIG. 4

ADAPTIVE CYCLIC REDUNDANCY CHECK FOR UPLINK CONTROL INFORMATION ENCODING

RELATED APPLICATION

The subject patent application is a continuation of, and claims priority to, U.S. patent application Ser. No. 15/402,097 (now U.S. Pat. No. 10,225,046), filed Jan. 9, 2017, and entitled "ADAPTIVE CYCLIC REDUNDANCY CHECK FOR UPLINK CONTROL INFORMATION ENCODING," the entirety of which application is hereby incorporated by reference herein.

TECHNICAL FIELD

The disclosed subject matter relates to cyclic redundancy check (CRC) design for uplink control information in a wireless system to enable improvement of wireless system performance over conventional wireless system technologies, e.g., for fifth generation (5G) technologies or other next generation networks.

BACKGROUND

To meet the huge demand for data centric applications, third generation partnership project (3GPP) systems and systems that employ one or more aspects of the specifications of fourth generation (4G) standards for wireless communications will be extended to fifth generation (5G) standards for wireless communications. Unique challenges exist to provide levels of service associated with forthcoming 5G and/or other next generation standards for wireless networks.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 4 illustrates an example block diagram of a CRC length map in accordance with various aspects and embodiments of the subject disclosure.

DETAILED DESCRIPTION

Figure 1:
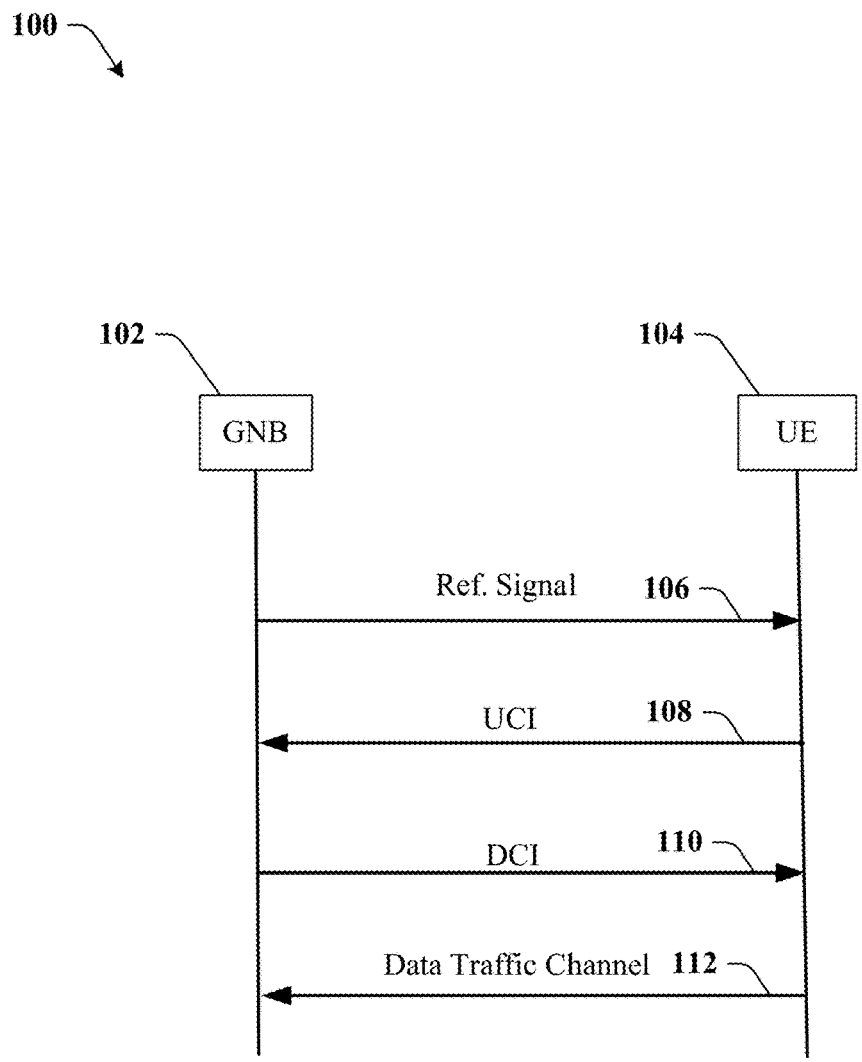
FIG. 1 illustrates an example schematic diagram of a message sequence chart for uplink control information in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

In an embodiment, a system can comprise a processor and a memory that stores executable instructions that, when executed by the processor, facilitate performance of operations, including determining a link quality characteristic between a mobile device and a base station device, wherein the link quality characteristic is associated with a likelihood of data in a first transmission between the mobile device and the base station device being corrupted. The operations can also include determining a number of cyclic redundancy check bits for the mobile device to include in a second transmission of uplink control information based on the link quality characteristic for a defined payload size of the second transmission. The operations can also include transmitting data representing the number of cyclic redundancy check bits to the mobile device.

In another embodiment, a method can include estimating, by a device comprising a processor, a probability that data in a transmission from a mobile device to a base station device will be corrupted. The method can also include generating, by the device, a cyclic redundancy check length map that indicates a number of cyclic redundancy check bits to include in an uplink control information transmission for channel state information of a predefined size, based on the probability. The method can also include transmitting, by the device, the cyclic redundancy check length map to the mobile device.

In another embodiment, a machine-readable storage medium, comprising executable instructions that, when executed by a processor of a device, facilitate performance of operations. The operations can include determining a link quality metric of a mobile device based on a beacon signal received by a base station device. The operations can also include determining a number of cyclic redundancy check bits to include in a first transmission of uplink control information based on the link quality metric and a number of bits of channel state information in the first transmission. The operations can also include transmitting a second transmission indicating the number of cyclic redundancy check bits.

Uplink control information is information that is sent from a user equipment (UE) device or mobile device on a network to a base station to inform the base station about what the UE needs and carries other information like channel state information which can represent the quality of the communication link as viewed from the UE. Correct decoding of the UCI is important for the base station device (gNodeB or eNodeB for 5G or 4G networks respectively) to correctly interpret the uplink control information. In some cases though, especially when the UE is power limited, near the outer range of communications in the base station cell, or if there is interference (e.g., multipath channel interference, etc.) that leads to inter symbol interference, multipath fading, and etc, there may be errors in the control information as received.

One way to mitigate these errors is in to increase transmission power of the uplink control channel information. However, this can drain the UE battery. Another method to mitigate this problem is to add cyclic redundancy check (CRC) bits. CRC bits encode messages by adding a fixed-length check value, for the purpose of error detection. A CRC-enabled device calculates a short, fixed-length binary sequence, known as the check value or CRC, for each block of data to be sent or stored and appends it to the data, forming a codeword. When a codeword is received or read, the device either compares its check value with one freshly calculated from the data block, or equivalently, performs a CRC on the whole codeword and compares the resulting check value with an expected residue constant. If the CRC check values do not match, then the block contains a data error. However, since the uplink control information needs to be transmitted often (periodically a periodically) adding these additional overhead bits causes degradation in the resource allocation for the uplink data channel.

Accordingly, an adaptive cyclic redundancy check scheme for uplink control information signaling is provided to allow a number of cyclic redundancy check bits to be adjusted based on the likelihood of data being corrupted during transmission. In this way, for mobile devices that are less likely to have their uplink control signaling be corrupted, the cyclic redundancy check bits can be lowered in number to allow larger uplink control information payloads and reduced processing time. In an embodiment, a base station device can send a cyclic redundancy check length map to a mobile device that indicates to the mobile device to use a specific number of cyclic redundancy bits to use per a specified payload size of uplink control information. In another embodiment, the mobile device can determine a number of cyclic redundancy bits to include in the uplink control information, and use two stage uplink control information signaling to indicate to the base station how many cyclic redundancy check bits there are in the succeeding stage.

Turning now to FIG. 1, illustrated is an example schematic diagram 100 of a message sequence chart for uplink control information in accordance with various aspects and embodiments of the subject disclosure. In an embodiment, a gNodeB 102 can send a reference signal 106 to a UE 104. The reference signal can be beamformed in some embodiments, or non beamformed in other embodiments.

Based on the reference signal 106, the UE 104 can measure the channel response, and determine channel state information (CSI) to give as feedback to the gNodeB 102. The channel state information can include a channel quality indicator, precoding matrix index, or advanced PMI. This channel state information can refer to the known channel properties of the communication link between the gNodeB 102 and the UE 104. The channel properties can reflect how the signal propagates from the transmitter to the receiver and represents the combined effect of, for example, scattering, fading, and power decay with distance. The method is called Channel estimation. The CSI makes it possible to adapt transmissions to current channel conditions. Based on the information being transmitted, in some embodiments, the amount of data required or number of bits to include in the UCI may vary. Therefore, adjusting the number of CRC bits can facilitate faster processing and higher throughput of the UCI transmission.

Once the channel state information is assembled, the UE 104 can transmit the UCI 108 to the gNodeB 102. Based, on the UCI 108, the gNodeB 102 can then send downlink control information (DCI) 110 to the UE 104 which enables the UE to send the data over the data traffic channel 112.

In an embodiment, the UE 104 can determine from the channel state information whether data is likely to be corrupted when transmitting to the gNodeB 102. If there is little likelihood of corruption (e.g., if the signal strength of the reference signal 106 is high, the reference signal 106 has high signal to noise or signal to interference plus noise, etc.), UE 104 can determine to add fewer CRC bits to the UCI 108. In some embodiments, no CRC bits can be added. In embodiments where the data is likely to be corrupted however, the UE 104 can add a larger number of CRC bits to make it easier to detect errors. In an embodiment, the UCI transmission 108 can be a two stage transmission, where the first stage includes an indicator informing the gNodeB of how many CRC bits will be included in the second stage, and then the second stage can include the main CSI payload, and be protected by the CRC bits. The first stage in an embodiment may not include the CRC bits so that the gNodeB 102 can accurately decode the transmission.

In another embodiment, the gNodeB 102 can estimate the likelihood of corruption for the UCI transmission 108, and generate a CRC length map table for the UE 104. The CRC length map table can include entries with CRC bit length and respective corresponding payload sizes for the UE 104 based on the link quality. As the link quality changes, the gNodeB 102 can update the length map table. The gNodeB 102 can transmit the CRC length map table to the UE 104 via higher layer signaling (e.g., radio resource control, etc.). The UE 104 can store the CRC length map table in memory until updated by the gNodeB 102.

Figure 2:
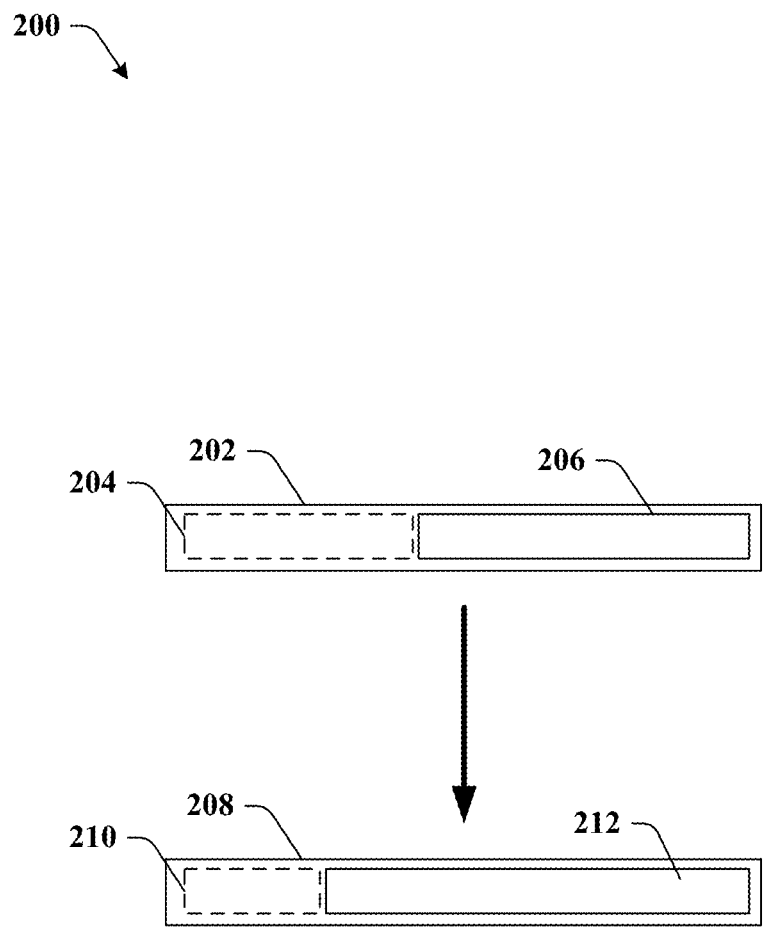
FIG. 2 illustrates an example block diagram of an uplink control block with variable CRC bits in accordance with various aspects and embodiments of the subject disclosure.

Turning now to FIG. 2, illustrated is an example block diagram 200 of an uplink control block with variable CRC bits in accordance with various aspects and embodiments of the subject disclosure.

In an embodiment, a information block 202 that carries uplink control information 206 can have a CRC block 204 with a certain number of CRC bits (e.g., 16 bits). This uplink control information block 202 can be transmitted by the UE to the base station device during times when the link quality is poor, due to a weak signal, multipath fading, multipath interference, and etc.

For another mobile device, or if the mobile device moves closer to the base station device, or if some environmental changes occur such that the link quality improves, a new uplink control information block 208 can be transmitted that has a smaller CRC section 210 (e.g., 8 bits of CRC bits) allowing a larger payload 212. In other embodiments, instead of increasing the size of the payload, the overall size of the uplink control information block 208 can be decreased.

In an embodiment, the CRC bits can be adjusted based on the size of the payload. If the payload is smaller, the CRC bits can be reduced since the likelihood of data errors can decrease with the smaller payload size. Likewise, if the payload is larger (e.g., the channel state information includes CQI, advanced PMI, etc) the number of CRC bits can be increased to ensure that any errors are detected.

Figure 3:
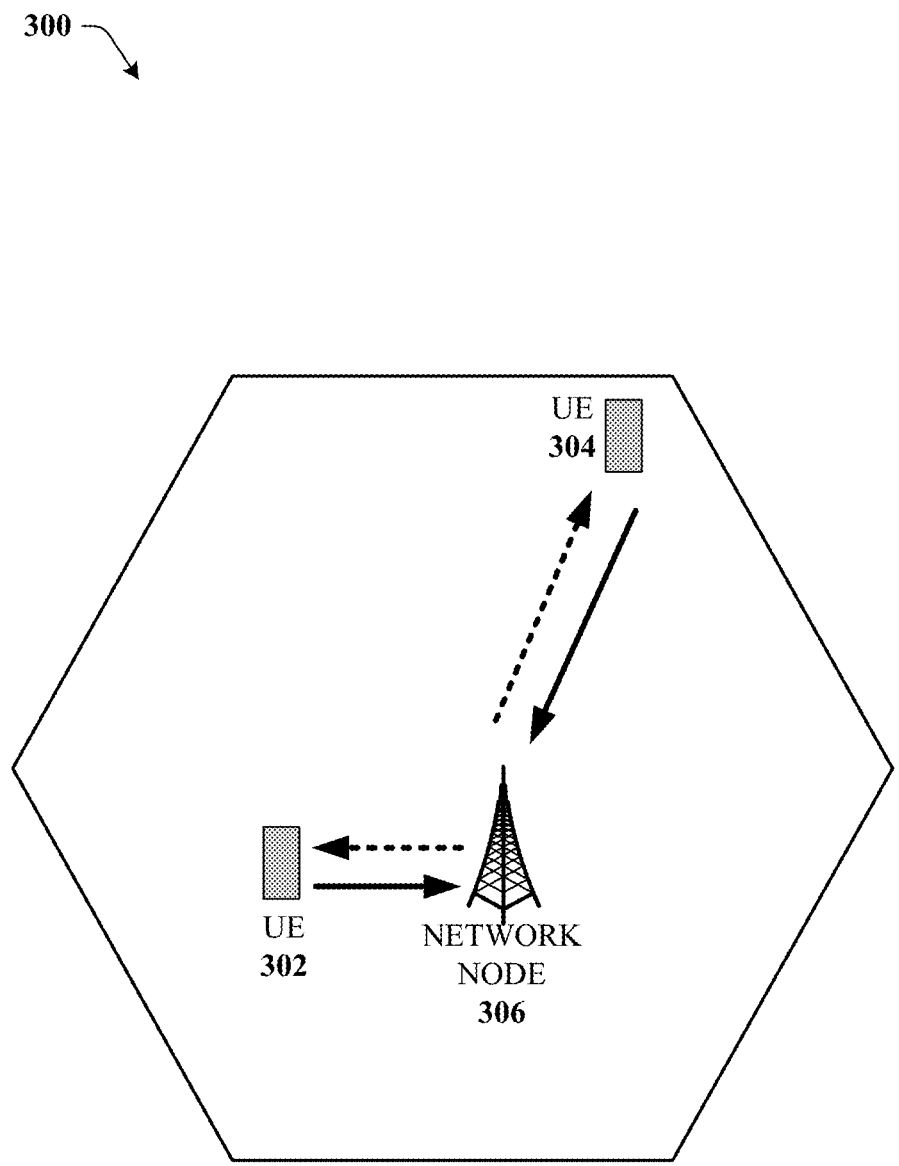
FIG. 3 illustrates an example block diagram of a wireless communication system that facilitates adaptive CRC in accordance with various aspects and embodiments of the subject disclosure.

Turning now to FIG. 3, illustrated is an example wireless communication system 300 that facilitates adaptive CRC in accordance with various aspects and embodiments of the subject disclosure. In one or more embodiments, system 300 can comprise one or more user equipment UEs 304 and 302, which can have one or more antenna panels having vertical and horizontal elements. A UE 302 can be a mobile device such as a cellular phone, a smartphone, a tablet computer, a wearable device, a virtual reality (VR) device, a heads-up display (HUD) device, a smart car, a machine-type communication (MTC) device, and the like. User equipment UE 302 can also comprise IOT devices that communicate wirelessly. In various embodiments, system 300 is or comprises a wireless communication network serviced by one or more wireless communication network providers. In example embodiments, a UE 302 can be communicatively coupled to the wireless communication network via a network node or base station device 306.

The non-limiting term network node (or radio network node) is used herein to refer to any type of network node serving a UE 302 and UE 304 and/or connected to other network node, network element, or another network node from which the UE 302 or 304 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 306) can include but are not limited to: NodeB devices, base station (BS) devices, access point (AP) devices, and radio access network (RAN) devices. The network node 306 can also include multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 306 can be referred to as a gNodeB device.

In example embodiments, the UE 302 and 304 can send and/or receive communication data via a wireless link to the network node 306. The dashed arrow lines from the network node 406 to the UE 302 and 304 represent downlink (DL) communications and the solid arrow lines from the UE 302 and 304 to the network nodes 306 represents an uplink (UL) communication.

Wireless communication system 300 can employ various cellular technologies and modulation schemes to facilitate wireless radio communications between devices (e.g., the UE 302 and 304 and the network node 306). For example, system 300 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 300 are particularly described wherein the devices (e.g., the UEs 302 and 304 and the network device 306) of system 300 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 300 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

In various embodiments, the network node 306 can estimate the link quality of the communication links between UE 302 and UE 304. The link quality can be related to signal loss, interferences, fading, and other factors which may contribute to data errors in transmissions between the network node 306 and the UE 302 and UE 304. In an embodiment, UE 304, being further away from the network node 306 than UE 302, may be estimated to have a lower link quality. Therefore, network node 306 can instruct UE 304 to include more CRC bits in uplink control information transmissions than UE 302.

Network node 306 can estimate the link quality based on determining the location of the UEs and calculating the distance from the network node 306. In other embodiments, network node 306 can use historical link qualities and other past data to estimate the current link quality.

Network node 306 can generate a CRC length map comprising a table with CRC bit values for specified payload sizes, such that the UE can select how many CRC bits to include in uplink control information transmissions based on the size of the payload or size and/or format of the channel state information. Network node 306 can transmit the CRC length map table to the UEs via higher layer signaling (e.g., radio resource control, etc.). The UEs can store the CRC length map table in memory until updated by the network node 306.

In other embodiments, UE 304 and 302 can determine the link quality based on measuring the reference signal from network node 306 or based on their location. If there is little likelihood of corruption (e.g., if the signal strength of the reference signal is high, the reference signal has high signal to noise or signal to interference plus noise, etc.), UE 302 or 304 can determine to add fewer CRC bits to the UCI. In some embodiments, no CRC bits can be added. In embodiments where the data is likely to be corrupted however, the UE 302 or 304 can add a larger number of CRC bits to make it easier to detect errors. In an embodiment, the UCI transmission can be a two stage transmission, where the first stage includes an indicator informing the network node 306 of how many CRC bits will be included in the second stage, and then the second stage can include the main CSI payload, and be protected by the CRC bits. The first stage in an embodiment may not include the CRC bits so that the network node 306 can accurately decode the transmission.

Turning now to FIG. 4, illustrated is an example block diagram 400 of a CRC length map 402 in accordance with various aspects and embodiments of the subject disclosure.

The CRC length map 402 can comprise a table with CRC bit values for specified payload sizes, such that the UE can select how many CRC bits to include in uplink control information transmissions based on the size of the payload or size and/or format of the channel state information. For example, in the embodiment shown in FIG. 4, for a given UE with a specified channel link quality, the network can determine that the UE should use 8 bits when the UCI payload size is 40 bits. When the payload size is 60 and 80 bits, the UE should use 12 and 16 bits of CRC accordingly. As the link quality changes, the network can send new tables with new CRC bit length values for the UE to select from based on the payload size. This table 402 can be transmitted to the UE via high layer signaling and be stored in memory at the UE, until a new table is sent, or conditions change.

Figure 5:
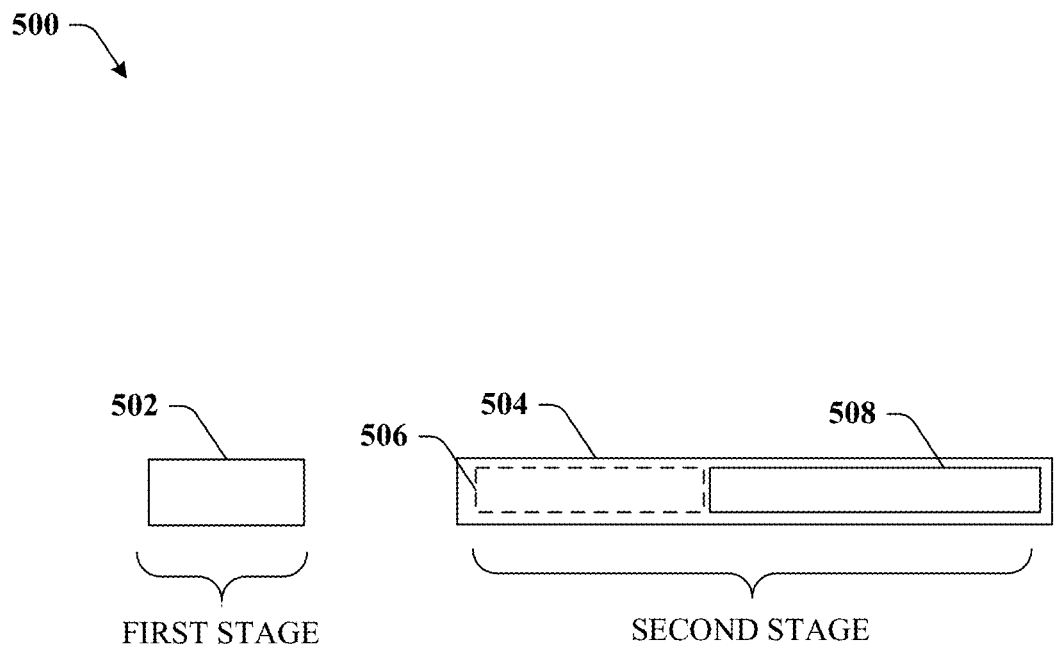
FIG. 5 illustrates an example block diagram of two stage uplink control information with adaptive CRC in accordance with various aspects and embodiments of the subject disclosure.

Turning now to FIG. 5, illustrated is an example block diagram 500 of a two stage uplink control information with adaptive CRC in accordance with various aspects and embodiments of the subject disclosure.

In an embodiment, a mobile device can send uplink control information in two stages, a first stage 502, and a second stage 504. The first stage 502 can include an indicator identifying the number of CRC bits in the second stage 504, and the second stage can include the uplink control information payload 508 with the CRC bits 506 included in the information block to facilitate the base station device checking the uplink control information for errors. The first stage 502 can, in an embodiment, not have any CRC bits appended to it.

Figure 6:
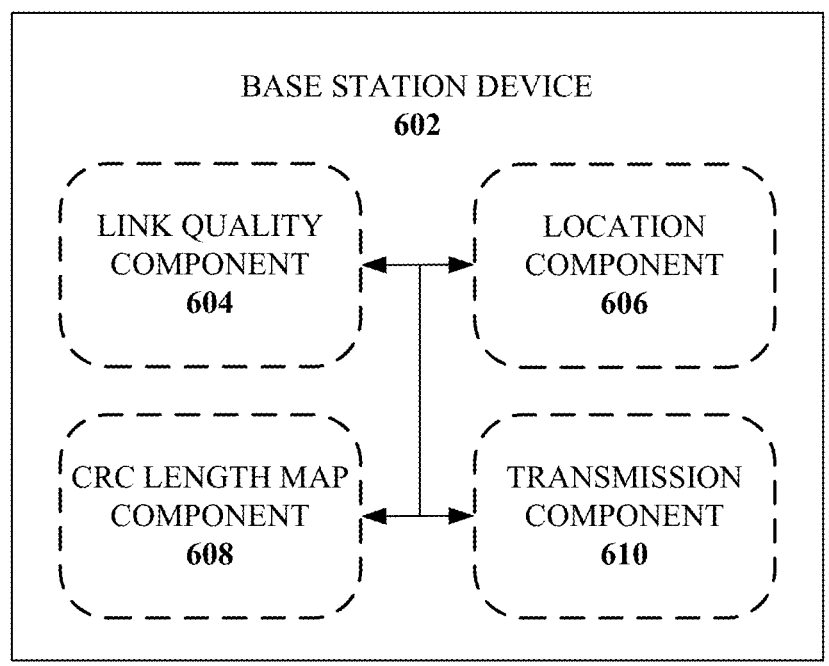
FIG. 6 illustrates an example block diagram of a base station device that facilitates adaptive CRC for uplink control information in accordance with various aspects and embodiments of the subject disclosure.

Turning now to FIG. 6, illustrated is an example block diagram 600 of a base station device 602 that facilitates adaptive CRC for uplink control information in accordance with various aspects and embodiments of the subject disclosure. Base station device 602 can be a base station or macrocell such as an eNodeB or gNodeB associated with 4G or 5G wireless networks.

The base station device 602 can include a link quality component 604 that determines a link quality metric of a mobile device based on a beacon signal received by a base station device, a CRC length map component 608 that determines a number of cyclic redundancy check bits to include in an uplink control information transmission based on the link quality metric and a number of bits of channel state information in the uplink control information transmission, and a transmission component 610 that transmits a first transmission indicating the number of cyclic redundancy check bits.

The link quality component 604 can estimate the link quality metric based on historical link quality metrics from the same or similar mobile devices. The link quality component 604 can also determine the link quality metric based on one or more beacon signals received from the mobile device. A location component 606 can retrieve the location of the mobile device from a network location service, or based on analyzing signals from the mobile device, and determine a relative distance from the base station device 602 to the mobile device. Based on the location, the link quality component 604 can estimate the link quality.

The CRC length map component 608 can generate a table that can include entries with CRC bit length and respective corresponding payload sizes for the mobile device based on the link quality. As the link quality changes, the CRC length map component 608 can update the length map table. The transmission component 610 can transmit the CRC length map table to the mobile device via higher layer signaling (e.g., radio resource control, etc.). The mobile device can store the CRC length map table in memory until updated by the base station device 602.

Figure 7:
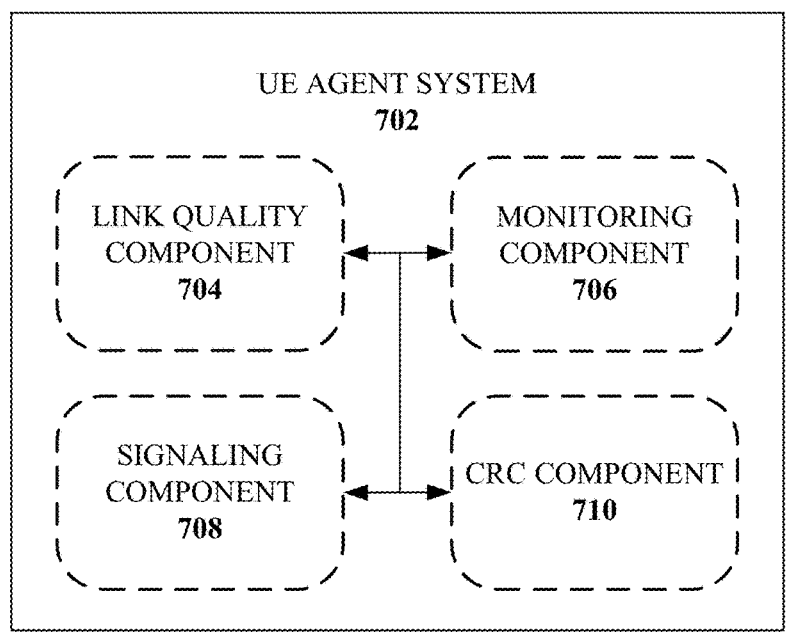
FIG. 7 illustrates an example block diagram of a mobile device that facilitates adaptive CRC for uplink control information in accordance with various aspects and embodiments of the subject disclosure.

Turning now to FIG. 7, illustrated is an example block diagram 700 of a UE agent system 702 that facilitates adaptive CRC for uplink control information in accordance with various aspects and embodiments of the subject disclosure.

The UE agent system 702 can include a link quality component 704 that determines a link quality characteristic between a mobile device and a base station device, wherein the link quality characteristic is associated with a likelihood of data in a transmission between the mobile device and base station device being corrupted. The UE agent system 702 can also include a CRC component that determines a number of cyclic redundancy check bits for the mobile device to include in an uplink control information transmission based on the link quality characteristic for a defined payload size of the uplink control information transmission. The UE agent system 702 can also include a signaling component 708 that transmits data representing the number of cyclic redundancy check bits to the mobile device The signaling component 708 can send the uplink control information in two stages, a first stage that indicates the number of CRC bits and a second stage that can include the uplink control information payload with the CRC bits included in the information block to facilitate the base station device checking the uplink control information for errors. The first stage can, in an embodiment, not have any CRC bits appended to it.

In an embodiment, the link quality component 704 can measure the channel response of a reference signal received from the base station device (e.g., base station device 602), and determine channel state information (CSI) to give as feedback to the base station device. The link quality component 704 can determine from the channel state information whether data is likely to be corrupted when transmitting to the base station device. If there is little likelihood of corruption (e.g., if the signal strength of the reference signal 106 is high, the reference signal 106 has high signal to noise or signal to interference plus noise, etc.), the CRC component 710 can determine the number of CRC bits to add to the uplink control information.

In one embodiment, the CRC component 710 can determine the number of bits to add based on a CRC length map (e.g., table 402) from a base station device and the amount of CSI information to be transmitted to the base station device. In other embodiments, the CRC component 710 can determine the number of CRC bits to add based on the link quality. Monitoring component 706 can monitor for changes in link quality or updates to CRC length maps, and CRC component 710 can adjust the number of CRC bits accordingly.

Figure 8:
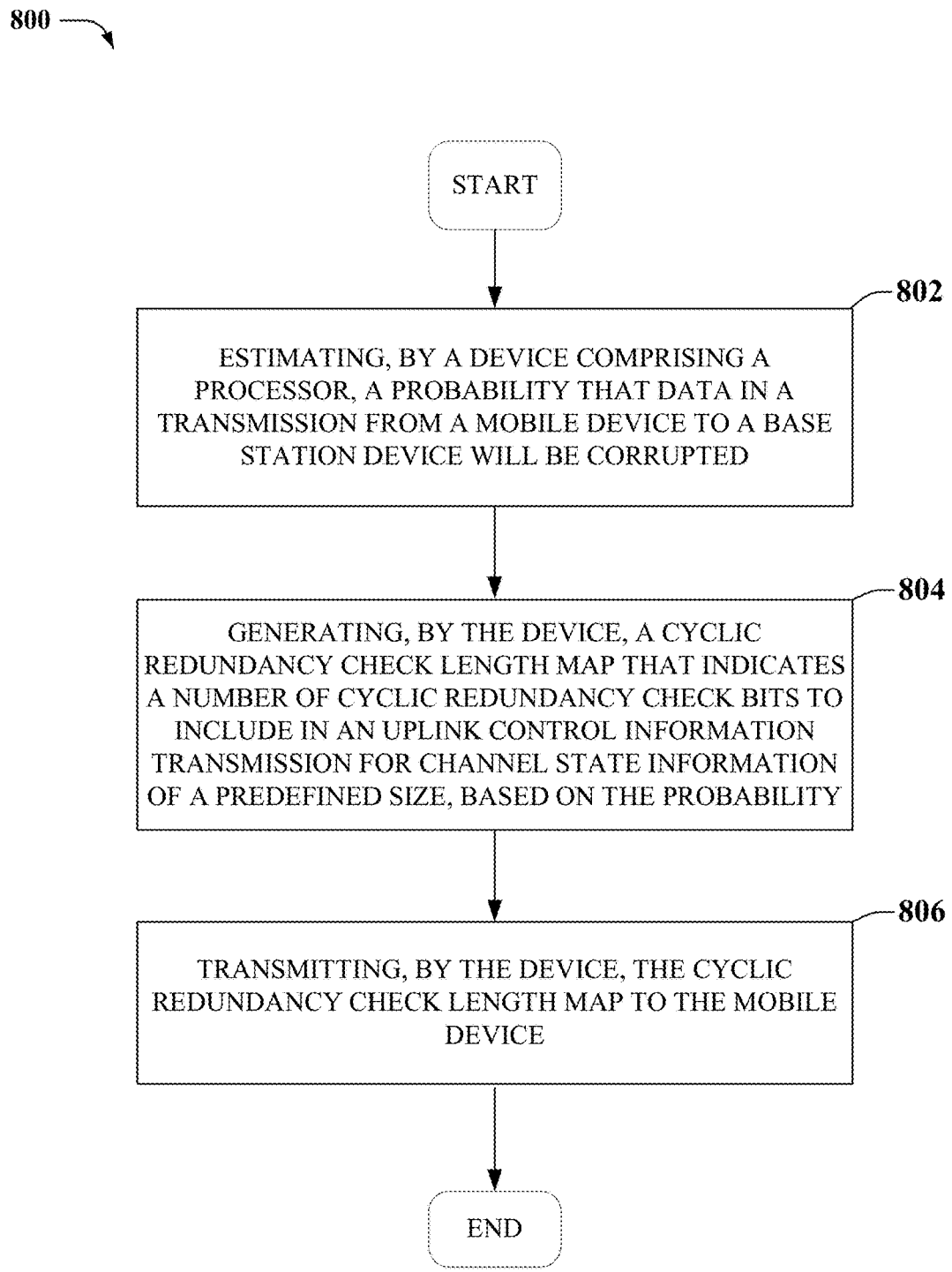
FIG. 8 illustrates an example method for adaptive CRC in accordance with various aspects and embodiments of the subject disclosure.

FIG. 8 illustrates a process in connection with the aforementioned systems. The process in FIG. 8 can be implemented for example by the systems in FIGS. 1-7 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 8, illustrated is an example method 800 for adjusting the size of an information block in accordance with various aspects and embodiments of the subject disclosure.

Method 800 can start at 802 where the method includes estimating, by a device comprising a processor, a probability that data in a transmission from a mobile device to a base station device will be corrupted (e.g., by link quality component 604).

At 804 the method includes generating, by the device, a cyclic redundancy check length map that indicates a number of cyclic redundancy check bits to include in an uplink control information transmission for channel state information of a predefined size, based on the probability (e.g., by CRC length map component 608). The CRC length map table can include entries with CRC bit length and respective corresponding payload sizes for the UE based on the link quality. As the link quality changes, the gNodeB can update the length map table.

Figure 9:
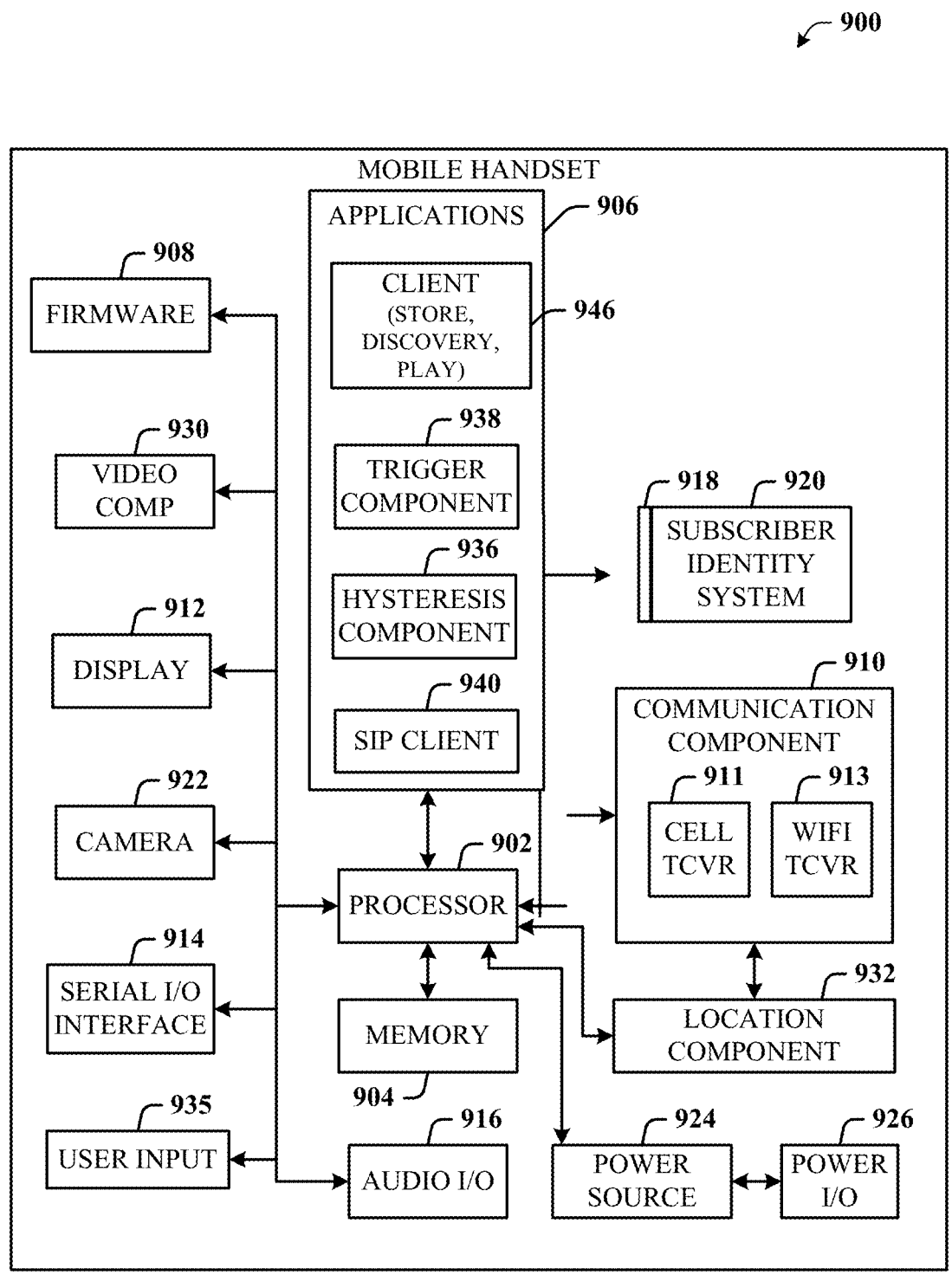
FIG. 9 illustrates an example block diagram of an example user equipment that can be a mobile handset operable to provide adaptive CRC in accordance with various aspects and embodiments of the subject disclosure.

At 806, the method includes transmitting, by the device, the cyclic redundancy check length map to the mobile device (e.g., by transmission component 610). The gNodeB can transmit the CRC length map table to the UE via higher layer signaling (e.g., radio resource control, etc.). The UE can store the CRC length map table in memory until updated by the gNodeB Referring now to FIG. 9, illustrated is a schematic block diagram of an example end-user device such as a user equipment (e.g., mobile device 302 or 304) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900 can include an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
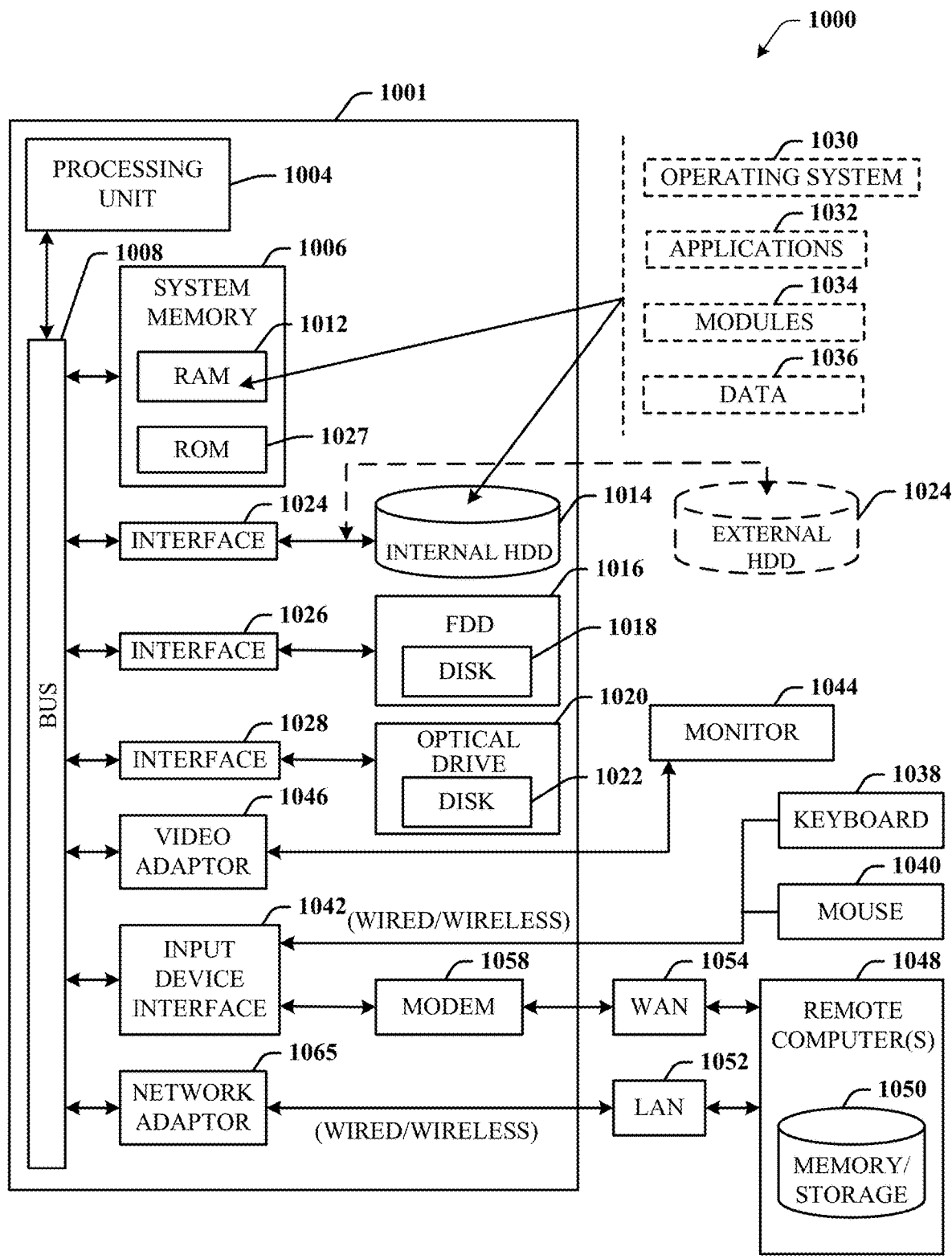
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the functions and operations performed in the described example embodiments. For example, a network node (e.g., network node 306) may contain components as described in FIG. 10.

The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 2394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10 BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
    determining, by a network device of a group of network devices, the network device comprising a processor, a number of cyclic redundancy check bits for a mobile device based on a link quality characteristic and a payload size of a transmission of uplink control information from the mobile device, wherein the uplink control information excludes information indicative of the link quality characteristic; and
    facilitating, by the network device, a transmission of data representing the number of cyclic redundancy check bits to the mobile device.

2. The method of claim 1, wherein the determining the number of cyclic redundancy check bits for the mobile device comprises adjusting the number of cyclic redundancy check bits to correspond to respective ones of different payload sizes.

3. The method of claim 2, wherein the adjusting the number of cyclic redundancy check bits comprises reducing the number of cyclic redundancy check bits based on a determination that the payload size is less than a defined payload size.

4. The method of claim 2, wherein the adjusting the number of cyclic redundancy check bits comprises increasing the number of cyclic redundancy check bits based on a determination that the payload size is more than a defined payload size.

5. The method of claim 1, wherein the transmission is a first transmission, and wherein the method further comprises:
determining, by the network device, the link quality characteristic based on a probability of data in a second transmission received from the mobile device being corrupted.

6. The method of claim 1, wherein the link quality characteristic is the link quality characteristic between the mobile device and the network device.

7. The method of claim 1, further comprising:
sending, by the network device, a cyclic redundancy check length map to the mobile device, wherein the cyclic redundancy check length map comprises an indication of a defined number of cyclic redundancy bits to use based on a defined payload size of uplink control information.

8. The method of claim 1, further comprising:
receiving, by the network device, an indication of the number of cyclic redundancy check bits included in the uplink control information specified by the mobile device.

9. The method of claim 8, wherein the receiving the indication comprises receiving the information via two stage uplink control information signaling.

10. The method of claim 1, wherein the determining the number of cyclic redundancy check bits for the mobile device based on the link quality characteristic comprises facilitating, by the network device, an adaptive cyclic redundancy check capability.

11. A system, comprising:
a processor; and
a memory that stores executable instructions that, when executed by the processor, facilitate performance of operations, comprising:
determining a number of cyclic redundancy check bits for use by a mobile device, wherein the number of cyclic redundancy check bits is determined based on a link quality characteristic and a payload size of a transmission of uplink control information from the mobile device, wherein the uplink control information does not comprise information indicative of the link quality characteristic; and
sending data representing the number of cyclic redundancy check bits to the mobile device.

12. The system of claim 11, wherein the operations further comprise:
adjusting the number of cyclic redundancy check bits based on the payload size, wherein the number of cyclic redundancy check bits is reduced based on a determination that the payload size is less than a defined payload size.

13. The system of claim 11, wherein the operations further comprise:
adjusting the number of cyclic redundancy check bits based on the payload size, wherein the number of cyclic redundancy check bits is increased based on a determination that the payload size is more than a defined payload size.

14. The system of claim 11, wherein the transmission is a first transmission, and wherein the operations further comprise:
determining the link quality characteristic based on a probability of data in a second transmission received from the mobile device being corrupted.

15. The system of claim 11, wherein the operations further comprise:
sending a cyclic redundancy check length map to the mobile device, wherein the cyclic redundancy check length map comprises an indication of the number of cyclic redundancy check bits to use based on a defined payload size of uplink control information.

16. The system of claim 11, wherein the operations further comprise:
facilitating an adaptive cyclic redundancy check capability for uplink control information based on the number of cyclic redundancy check bits determined as a function of the link quality characteristic.

17. A non-transitory machine-readable medium, comprising executable instructions that, when executed by a processor, facilitate performance of operations, comprising:
ascertaining a number of cyclic redundancy check bits based on a link quality characteristic and a payload size of a transmission of uplink control information from a mobile device, wherein first information indicative of the link quality characteristic is not included in the uplink control information; and
sending second information representative of the number of cyclic redundancy check bits to the mobile device.

18. The non-transitory machine-readable medium of claim 17, wherein the operations further comprise:
increasing the number of cyclic redundancy check bits based on a first determination that the payload size is more than a defined payload size; and
decreasing the number of cyclic redundancy check bits based on a second determination that the payload size is less than the defined payload size.

19. The non-transitory machine-readable medium of claim 17, wherein the transmission is a first transmission, and wherein the operations further comprise:
determining the link quality characteristic based on a probability of data in a second transmission received from the mobile device is corrupted data.

20. The non-transitory machine-readable medium of claim 17, wherein the operations further comprise:
providing an adaptive cyclic redundancy check capability for uplink control information based on the number of cyclic redundancy check bits determined as a function of the link quality characteristic.

* * * * *